United States Patent
Meyer et al.

(10) Patent No.: US 10,355,553 B2
(45) Date of Patent: Jul. 16, 2019

(54) ELECTRIC MACHINE COMPRISING A POLE HOUSING

(71) Applicant: Robert Bosch GmbH, Stuttgart (DE)

(72) Inventors: Christian Meyer, Karlsruhe-Wolfartsweier (DE); Markus Peters, Kappelrodeck (DE); Sebastian Hansen, Sasbach (DE); Torsten Gmuend, Rastatt-Pliitersdorf (DE); Christian Acker, Leutenheim (FR)

(73) Assignee: Robert Bosch GmbH, Stuttgart (DE)

( * ) Notice: Subject to any disclaimer, the term of this patent is extended or adjusted under 35 U.S.C. 154(b) by 439 days.

(21) Appl. No.: 15/121,956

(22) PCT Filed: Dec. 29, 2014

(86) PCT No.: PCT/EP2014/079381
§ 371 (c)(1),
(2) Date: Aug. 26, 2016

(87) PCT Pub. No.: WO2015/128047
PCT Pub. Date: Sep. 3, 2015

(65) Prior Publication Data
US 2017/0077778 A1    Mar. 16, 2017

(30) Foreign Application Priority Data

Feb. 27, 2014  (DE) .................. 10 2014 203 542

(51) Int. Cl.
*H02K 11/00*    (2016.01)
*H02K 5/10*     (2006.01)
*H02K 11/33*    (2016.01)

(52) U.S. Cl.
CPC ............... *H02K 5/10* (2013.01); *H02K 11/33* (2016.01)

(58) Field of Classification Search
CPC .................. H02K 5/10; H02K 11/33
(Continued)

(56) References Cited

U.S. PATENT DOCUMENTS 6,297,572 B1 * 10/2001 Sunaga ................. H02K 11/33
                                                            310/64
7,015,605 B1 *  3/2006 Peter .................... H02K 1/187
                                                            310/51

(Continued)

FOREIGN PATENT DOCUMENTS

CN    200944543      9/2007
CN    201230246 Y   4/2009
(Continued)

OTHER PUBLICATIONS

International Search Report for Application No. PCT/EP2014/079381 dated Jul. 31, 2015 (English Translation, 2 pages).

*Primary Examiner* — Thanh Lam
(74) *Attorney, Agent, or Firm* — Michael Best & Friedrich LLP

(57) ABSTRACT

Disclosed is an electric machine (10) comprising a pole housing (12) and a printed circuit board (14) for controlling the electric machine (10). The circuit board (14) is arranged on a flanged side (16) of the pole housing (12), and a protective wall (18) which protects the circuit board (14) from loose small parts is arranged between the circuit board (14) and the pole housing (12).

16 Claims, 1 Drawing Sheet

(58) Field of Classification Search
USPC .................. 310/68 D, 71, 67 R, 89, 310
See application file for complete search history.

(56) References Cited

U.S. PATENT DOCUMENTS

| | | | | |
|---|---|---|---|---|
| 8,742,637 B2* | 6/2014 | Liu | ............. | H02K 5/10 |
| | | | | 310/88 |
| 2014/0054991 A1* | 2/2014 | Hyodo | ............. | F04C 2/18 |
| | | | | 310/71 |
| 2015/0069886 A1* | 3/2015 | Hsu | ............. | H02K 5/10 |
| | | | | 310/68 D |
| 2018/0093698 A1* | 4/2018 | Urimoto | ............. | H02K 11/21 |
| 2019/0003485 A1* | 1/2019 | Nogamida | ............. | F04D 29/4226 |

FOREIGN PATENT DOCUMENTS

| | | | |
|---|---|---|---|
| CN | 102457120 A | | 5/2012 |
| CN | 103066755 A | | 4/2013 |
| DE | 102011002992 | | 7/2012 |
| EP | 1878824 | | 1/2008 |
| FR | 2574554 | | 6/1986 |
| JP | S4947986 A | | 5/1974 |
| JP | H0233568 U | | 3/1990 |
| JP | H0439053 U | | 4/1992 |
| JP | H0518275 U | | 3/1993 |
| JP | H0775288 A | | 3/1995 |
| JP | H08205467 A | | 8/1996 |
| JP | H10215536 A | | 8/1998 |
| JP | 2002112504 A | | 4/2002 |
| JP | 2003164097 A | | 6/2003 |
| JP | 2009033842 A | | 2/2009 |
| JP | 2010141988 A | | 6/2010 |
| JP | 2012253847 A | | 12/2012 |
| JP | 2013219915 A | | 10/2013 |
| JP | 2015517631 A | | 6/2015 |

\* cited by examiner

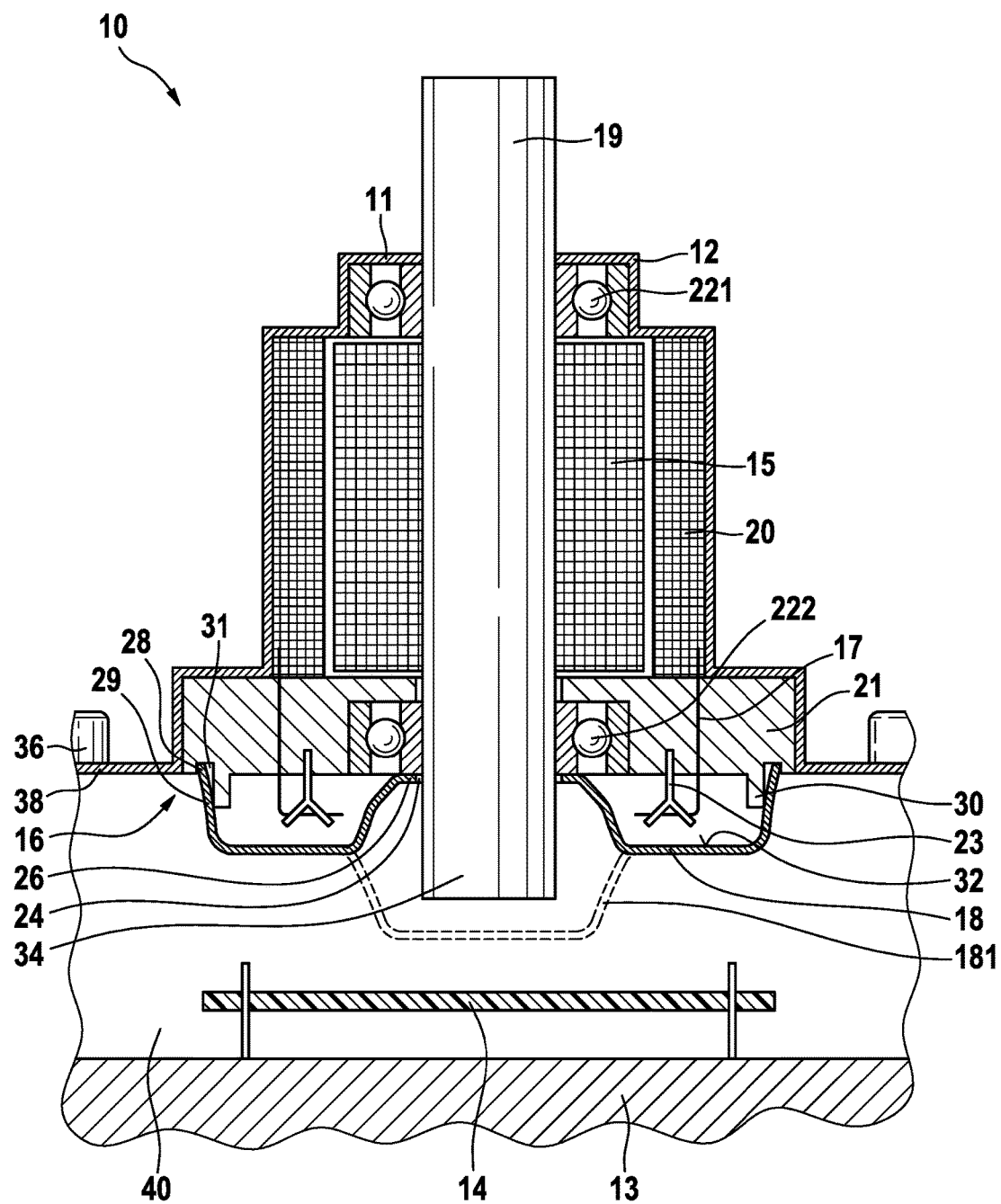

ELECTRIC MACHINE COMPRISING A POLE HOUSING

BACKGROUND OF THE INVENTION

The invention relates to an electric machine comprising a pole housing and electronics. An electrical printed circuit board containing a control circuit is used for controlling the electric machine.

An electric machine is known from the French patent application FR 2 574 554 A1 in which an electrical printed circuit board is installed in the same housing interior space with the bearing and the stator as well as with the magnets and the rotor. Such an arrangement of mechanical and electronic components in a common housing interior space can lead to electrical short circuits of the printed circuit board or, respectively, of the electronic components. Hence, dirt particles such as shavings or condensed water, e.g. soldering points or pins of components, come in contact to one another which ultimately leads to the short circuit. These disadvantages are rectified by the following invention.

SUMMARY OF THE INVENTION

The electric machine according to the invention has the advantage with respect to the prior art that the printed circuit board is protected by a separately manufactured protective wall from mechanical components in the pole housing. The protective wall is a component unto itself and not a constituent part of a housing or bearing shield or an interconnection plate. In so doing, the printed circuit board is arranged on a flanged side of the pole housing so that said printed circuit board and the components to be controlled, e.g. the coils of the stator can be connected by the shortest possible way. The protective wall between the printed circuit board and the pole housing prevents loose small parts from the pole housing from coming in contact with the printed circuit board. Such small parts can, for example, be conductive small pieces of metal, screws, dirt particles and other small parts that are conductive.

At least one rotor comprising a shaft, a stator, an interconnection plate and a bearing is advantageously arranged in the pole housing. The bearing and the rotor are arranged on the shaft. The rotor including the shaft and the bearings is disposed in the stator. The stator concentrically surrounds the rotor. The interconnection plate is disposed on the flanged side. One of the bearings is disposed in a bearing seat in an axial end face of the interconnection plate. The printed circuit board is arranged outside of the pole housing on the flanged side so that said printed circuit board lies axially opposite to the mechanical components and is isolated from the components by means of the discrete protective wall. In this way, the mechanical components in the pole housing can be easily isolated from the printed circuit board by means of a protective wall between printed circuit board and pole housing. Nevertheless, this arrangement allows for a sensor signal to be picked up and for the stator coils to be actuated across the spatially shortest path possible.

An advantageous embodiment is possible in which the protective wall is arranged axially outside of the pole housing on the flanged side. In this way, it is possible to secure the protective wall in the pole housing.

A further embodiment is possible in which the protective wall is arranged in the pole housing. In this case, the protective wall can be arranged in its entirety axially in the pole housing. It is also conceivable to only arrange a portion of the protective wall in the pole housing. This embodiment has the advantage of saving on installation space because the axial length of the electric machine can be accordingly reduced.

In an expedient manner, the protective wall is adapted in shape to the flanged side and to the parts mounted in the pole housing, so that the contour of the parts, such as, e.g., the interconnection plate and the contacts thereof, stand out on the protective wall. Hence, the protective wall can fit closely to the shape of the interconnection plate and the contactings thereof. The protective wall which is adapted in shape approximately reproduces the components on the flanged side. The protective wall can be fit in a positive-locking manner to the end of the pole housing and the mechanical components. An optimal sealing from small parts from the pole housing is also possible if the protective wall is adapted, according to the shape thereof on the flanged side of the pole housing, to the components. In this way, installation space is likewise saved.

The protective wall is advantageously a closed surface which is surrounded by an edge. Hence, the protective wall does not have any recesses which are spaced apart from the edge so that they lie within the surface. In this way, it is possible to completely shield the interior of the pole housing with respect to the printed circuit board. In this way, the greatest possible protection of the printed circuit board is ensured.

A further embodiment is conceivable which, in an advantageous manner, comprises a guiding duct for the shaft in the protective wall. The guiding duct is surrounded by an edge. In order to guide the shaft, further guiding ducts can be formed, which can be used for the actuation lines and/or the sensor lines. The guiding duct for the shaft lies in the center of the protective wall. In principle, various shapes for the guiding duct are possible. The guiding duct is preferably correspondingly shaped to the shape of the components to be led through the same. The guiding duct is, for example, circular for a shaft. This embodiment likewise leads to a saving of installation space.

In order that the advantageous effect of the protective wall is realized, a radially outer edge of the protective wall must closely fit axially to the interconnection plate so that no small parts can move between protective wall and interconnection plate. In the case of a guiding duct for the shaft in the protective wall, the edge of the guiding duct must likewise fit closely in the axial direction to the bearing disposed on the shaft.

In an advantageous manner, the interconnection plate has an axial projection on the end face. The projection extends in the axial direction away from the interconnection plate. The interconnection plate further comprises a recess radially on the outside next to the projection, which preferably adjoins the projection. The recess extends axially into the interconnection plate and therefore in the opposite direction of the projection. The projection and the recess extend along the circumferential direction of the interconnection plate. They preferably extend over the complete circumference of the interconnection plate so that the projection and the recess are closed in the circumferential direction. A region of the protective wall lies against the projection, said region extending radially inwards and adjoining the edge of said protective wall. The edge of the protective wall engages in the recess. In the end position of the protective wall, the edge is disposed in the recess. The end position is thereby characterized in that the protective wall is fully fitted in an operationally ready electric machine and reliably shields small parts. In this way, the region of the edge of the protective wall is braced between the recess and the projection or at least multiply makes contact with the interconnection plate. As a result, a large amount of sealing takes place between the interconnection plate and the protective wall.

A quick and cost-effective fixing of the protective wall to a mechanical component of the electric machine or to the pole housing is achieved by welding, such as ultrasonic welding, without using additional materials. The pole housing can thus consist of metal or plastic.

A further quick and cost effective way to secure the protective wall between the printed circuit board and the pole housing is provided through the use of screws or rivets. It is also possible to secure the protective wall by means of a clip fastener on the pole housing or on a component that is supported in the pole housing. It is furthermore possible to use a bonding adhesive for securing the protective wall.

The protective wall is manufactured from a plastic material, preferably a polyamide 66 (Pa66). This allows for a serial production in a cost-effective manner. It is also conceivable to manufacture the protective wall from a metal, e.g. steel or an aluminum sheet.

The protective wall according to the invention can advantageously be provided with an adhesive layer. The adhesive layer is used to bind the small parts which move in the interior of the pole housing in the direction of the printed circuit board. Short circuits can thus be prevented not only by an isolation of the printed circuit board by means of the protective wall but also by the bonding of conductive small parts to the protective wall. The adhesive layer is preferably arranged on the side of the protective wall facing the mechanical components. In so doing, the adhesive layer contains an adhesive which is preferably a casting compound. In this way, an advantageous serial production can be ensured.

The adhesive layer according to the invention contains at least in part natural rubber and/or synthetic rubber and/or acrylate. This ensures a permanent adhesive effect.

The electric machine is used as an adjustment drive in an automobile, for example as a window lifter, a sun roof drive, a trunk lid actuator and/or a drive of a transmission switching mechanism. A secure and permanent operation of the components to be adjusted, e.g. in an engine compartment, is ensured by the electric machine according to the invention.

BRIEF DESCRIPTION OF THE DRAWINGS

An exemplary embodiment of the invention is depicted in the drawing and is explained in detail in the following description. In the drawing:

FIG. 1 shows an axial cross section through an inventive electric machine comprising a protective wall.

DETAILED DESCRIPTION

An electric machine 10 is shown in FIG. 1. The electric machine 10 has a pole housing 12. Components 25 are arranged in the pole housing 12, wherein the components 25 comprise a stator 20 including coils, a rotor 15 having a rotor shaft 19, an interconnection plate 21 and two bearings 221, 222. The components 25 are disposed concentrically with respect to one another in the pole housing 12. In so doing, the stator 20 is disposed in such a way that the stator 20 directly contacts the pole housing 12. Furthermore, the stator 20 is completely inserted along the length thereof in the pole housing 12, so that the stator 20 does not axially protrude out of the pole housing 12. The bearing 221, 222 and the rotor 15 are arranged on the rotor shaft 19, wherein the rotor 15 is disposed between the two bearings 221, 222. The rotor shaft 19 is concentrically surrounded by rotor 15. The rotor shaft 19 protrudes out of the pole housing 12 on an output side 11. One of the two bearings 221 is located on the output side 11. The bearing 221 is disposed in a pole housing part which has the same diameter as the outer diameter of the bearing 221. The rotor 15 is concentrically surrounded by the stator 20 in the installed state.

The stator 20 is fixedly connected to the pole housing 12. The interconnection plate 21 is disposed on a flanged side 16 of the pole housing 12 that lies opposite to the output side 11 in the axial direction. The interconnection plate 21 has a guiding duct for the rotor shaft 19. The interconnection plate 21 is arranged concentrically in relation to the rotor shaft 19. The housing section on the flanged side 16, in which the interconnection plate 21 is mounted, has the same diameter as the outside diameter of the interconnection plate 21. The second of the two bearings 222 is arranged in the interconnection plate 21. The interconnection plate 21 is fixedly connected to the pole housing 12, e.g. by press fitting or adhesive bonding, and thus forms a bearing shield for the rotor shaft 19. Contacts 23 are arranged in the interconnection plate 21 which can be contacted on an end face 33 oriented in the axial direction. The end face 33 forms the side of the interconnection plate 21 which is oriented transversely to the rotor shaft 19 and faces away from the stator 20. Wires 17 are led away from the coils of the stator 20. The wires are guided past the interconnection plate 21 and/or through the interconnection plate 21 in order to then be connected to the contacts 23. This connection is produced by welding or soldering.

A projection 30 is integrally formed on the interconnection plate 21. The projection 30 is located on the end face 33 of the interconnection plate 21. The projection 30 is disposed on the radially outer region of the end face 33 of the interconnection plate 21. Thus, the projection 30 faces axially away from the stator 20. In relation to the stator 20, the projection 30 extends axially in the opposite direction. In addition, the projection 30 extends in the circumferential direction of the interconnection plate 21. In a preferred manner, the projection 30 thus forms a circular—preferably closed—collar on the end face 33 of the interconnection plate 21.

In the radially outward direction, a recess 31 is arranged next to the projection 30 on the end face 33. The recess 31 extends axially into the interconnection plate 21. The recess 31 extends along the circumferential direction of the interconnection plate 21 so that the recess 31 has a closed annular shape.

A protective wall 18 is arranged on the axial flanged side 16 of the pole housing 12. The protective wall 18 thereby rests at least against the interconnection plate 21. To this end, a radially outer edge 28 of the protective wall 18 engages into the recess 31 so that the edge 28 is disposed in the end position thereof in the recess 31. The operational ready electric machine 10 has such a fully fitted protective wall 18 in the end position. Furthermore, a region 29 which extends radially inwards and is adjacent to the edge 28 abuts against the projection 30. In this way, the protective wall 18 is fixed because the edge 28 and the region 29 thereof are braced by means of the recess 31 and the projection 30. To this end, the edge 28 abuts in the recess 31 against wall thereof which is disposed in the radially outward direction. In this way, a portion on the outermost region of the interconnection plate 21 remains uncovered by the protective wall 22.

The protective wall 18 has a guiding duct 24 in the center thereof. The guiding duct 24 has an edge 26. The edge 26 abuts against the second bearing 222. In so doing, the protective wall 18 abuts tightly on the bearing 222. The shaft 19 protrudes out of the guiding duct 24. In this way, the protruding end 34 of the shaft 19 is not covered by the protective wall 22. A further embodiment is conceivable, in which a protective wall 181 does not have a guiding duct 24. In this way, the protective wall 181 has a surface without holes so that the end 34 of the shaft 19 is covered by the protective wall 181. Hence, all of the components 25 are isolated from the printed circuit board 14 by the protective wall. This is depicted in FIG. 1 by the dashed line. The protective wall 18, 181 is adapted in shape to the contour of the interconnection plate 21 as well as the contacts thereof, to the bearing 222 and to the shaft 19. The protective wall 18, 181 therefore fits snugly to the interconnection plate 21 and the contacts 23 on the flanged side 16 so that the contours thereof stand out at least approximately on the protective wall 22.

The protective wall 18, 181 has an adhesive layer 32 on the side thereof facing the interior of the pole housing 12. The adhesive layer 32 is preferably designed as a film. In a further embodiment, the adhesive layer 32 is applied to both sides of the protective wall. The film contains, e.g., natural rubber or synthetic rubber or acrylate. A variant of the embodiment is possible in which the adhesive layer 32 is applied to the protective wall 18, 181 as casting compound. Said adhesive layer is spread as a casting compound either using a brush or a putty knife or is spread by the force of gravity by the protective wall 22 being placed in different positions so that the casting compound deliquesces and covers the protective wall 22.

The printed circuit board is arranged axially beside the flanged side 16. The printed circuit board preferably extends transversely to the axial direction 39 of the pole housing 12. The printed circuit board 14 is fastened to a heat sink 13. The heat sink 13 is disposed axially beside the printed circuit board. The printed circuit board 14 lies between the heat sink 13 and the pole housing 12. The protective wall 18, 181 is mounted between the printed circuit board 14 and the pole housing 12. The heat sink 13 is disposed on the motor housing 37, the motor housing 37 being mounted to the pole housing 12 using fastening means 36. The heat sink 13 can also be designed as an integral component of the motor housing 37. A mounting collar 38 is provided on the pole housing 12 for this purpose. The mounting collar 38 is located on the flanged side 16 of the pole housing 12. In so doing, the mounting collar 38 is mounted on the pole housing 12 in the radially outward direction. The mounting collar 38 preferably extends transversely to the axial direction of the pole housing 12. The fastening means 36 preferably engage around the mounting collar 38. Hence, the heat sink 13, the motor housing 37, the fastening means 36, the mounting collar 38 and the protective wall 18, 181 form a closed space 40 in which the printed circuit board 14 is disposed. The space 40 is sealingly isolated from the surroundings thereof and from the interior of the pole housing 12 with regard to dust, shavings, dirt and other small parts.

It should further be noted in regard to the exemplary embodiment shown in the figure and described in the detailed description that a multiplicity of options which combine the individual features among one another is possible.

The electric machine 10 comprising the inventive protective wall 18 is used in a preferable manner in motor vehicles, in particular for adjusting sun roofs, window lifters, tailgates and seats. The electric machine 10 according to the invention is furthermore used as an actuating drive in gearbox actuators. The electric machine 10 is however not limited to such an application.

The invention claimed is:

1. An electric machine (10) comprising a pole housing (12) and a printed circuit board (14) for controlling the electric machine (10), wherein the printed circuit board (14) is arranged on a flanged side (16), which forms an axial end of the pole housing (12), characterized in that a discrete protective wall (18) is arranged between the printed circuit board (14) and the pole housing (12), the protective wall (18) protecting the printed circuit board (14) from loose small parts, characterized in that mechanical components (25) are arranged in the pole housing (12), which mechanical components comprise bearings (221, 222) disposed on a shaft (19), a rotor (15) and a stator (20), the shaft (19) together with the bearings (221, 222) and the rotor (15) being arranged concentrically, and the mechanical components also comprising an interconnection plate (21) disposed on the flanged side (16), wherein one of the bearings (222) is disposed in the interconnection plate and the printed circuit board (14) lies axially opposite to the mechanical components (25) and is isolated from the components (25) by the discrete protective wall (18).

2. The electric machine (10) according to claim 1, characterized in that the protective wall (18) is disposed axially outside of the pole housing (12).

3. The electric machine (10) according to claim 1, characterized in that the protective wall (18) is arranged in the pole housing (12).

4. The electric machine (10) according to claim 1, characterized in that the protective wall (18) is adapted in shape to the flanged side (16) of the interconnection plate (21).

5. The electric machine (10) according to claim 1, characterized in that the protective wall (18, 181) does not have any holes.

6. The electric machine (10) according to claim 1, characterized in that the protective wall (18) has at least one guiding duct (24) for the shaft (19), said guiding duct (24) being arranged in a center of the protective wall (18).

7. The electric machine (10) according to claim 6, characterized in that an edge (26) of the guiding duct (24) abuts against the bearing (222) which is disposed in the interconnection plate (21) and a radially outer edge (28) of the protective wall (18) abuts against the interconnection plate (21).

8. The electric machine (10) according to claim 1, characterized in that the interconnection plate (21) comprises an axial projection (30), wherein an axial recess (31) is disposed contiguously on the projection (30) in a radially outward direction, wherein the projection (30) and the recess (31) extend along a circumferential direction of the interconnection plate (21), wherein the protective wall (18) rests with a region (29) of an edge (28) thereof on the projection (30) of the interconnection plate (21) and protrudes into the recess (31).

9. The electric machine (10) according to claim 1, characterized in that the protective wall (18) is mounted on a mechanical component (20, 21, 221) of the electric machine (10) or on the pole housing (12) by means of welding without additional material, or by means of adhesive bonding.

10. The electric machine (10) according to claim 1, characterized in that the protective wall (18) is mounted by means of a clip fastener or by means of screws.

11. The electric machine (10) according to claim 1, characterized in that the protective wall (18) is made of plastic.

12. The electric machine (10) according to claim 1, characterized in that the protective wall (18) is provided with an adhesive layer (32), the adhesive layer (32) being disposed on an opposite side in relation to the printed circuit board (14) and said adhesive layer (32).

13. The electric machine (10) according to claim 1, characterized in that the adhesive layer (32) contains natural rubber, synthetic rubber and/or acrylate.

14. The electric machine (10) according to claim 1, wherein the electric machine (10) is configured for adjusting movable parts in an engine compartment of a motor vehicle or as an adjustment drive for a window lifter, a sun roof drive, a trunk lid drive and or the drive of a gear switching mechanism.

15. The electric machine (10) according to claim 1, characterized in that the protective wall (18) consists of PA 66.

16. The electric machine (10) according to claim 1, characterized in that the protective wall (18) is provided with an adhesive layer (32), the adhesive layer (32) being disposed on the opposite side in relation to the printed circuit board (14) and said adhesive layer (32) containing a casting compound.

* * * * *